United States Patent
Inokuchi et al.

(10) Patent No.: US 7,231,520 B2
(45) Date of Patent: *Jun. 12, 2007

(54) METHOD OF, AND APPARATUS FOR, RECORDING/REPRODUCING DATA TO/FROM RECORDING MEDIUM HAVING COPYRIGHT MANAGEMENT DATA RECORDED THEREIN

(75) Inventors: Tatsuya Inokuchi, Kanagawa (JP); Yoichiro Sako, Tokyo (JP); Mitsuru Toriyama, Chiba (JP)

(73) Assignee: Sony Corporation (JP)

( * ) Notice: Subject to any disclaimer, the term of this patent is extended or adjusted under 35 U.S.C. 154(b) by 813 days.

This patent is subject to a terminal disclaimer.

(21) Appl. No.: 10/088,336

(22) PCT Filed: Jul. 17, 2001

(86) PCT No.: PCT/JP01/06184

§ 371 (c)(1),
(2), (4) Date: Jun. 13, 2002

(87) PCT Pub. No.: WO02/07162

PCT Pub. Date: Jan. 24, 2002

(65) Prior Publication Data

US 2002/0157012 A1 Oct. 24, 2002

(30) Foreign Application Priority Data

Jul. 17, 2000 (JP) ............................ 2000-216388
Mar. 27, 2001 (JP) ............................ 2001-091266

(51) Int. Cl.
*G06F 21/00* (2006.01)
*G06F 21/04* (2006.01)

(52) U.S. Cl. ..................................... 713/171; 713/189

(58) Field of Classification Search ................ 713/171, 713/193, 191
See application file for complete search history.

(56) References Cited

U.S. PATENT DOCUMENTS 4,999,661 A * 3/1991 Ueno et al. ................. 396/100
5,596,639 A 1/1997 Kikinis (Continued)

FOREIGN PATENT DOCUMENTS

EP 0268139 5/1988

(Continued)

OTHER PUBLICATIONS

Schneier, Bruce; Applied Cryptography; 1996; 2nd Edition, John Wiley & Sons, Inc.; Chapter 2.*

(Continued)

*Primary Examiner*—Gilberto Barron, Jr.
*Assistant Examiner*—Jung Kim
(74) *Attorney, Agent, or Firm*—Lerner, David, Littenberg, Krumholz & Mentlik, LLP

(57) ABSTRACT

A method of recording data from a recorder to a recording medium, where it is judged whether a terminal unit having user identification information recorded in memory therein is connected to the recorder. When the terminal unit is found connected, an encryption key is exchanged between the recorder and terminal unit, user identification information read from the memory of the terminal unit is encrypted with the exchanged encryption key, sent from the terminal unit to the recorder, and the encrypted user identification information is recorded to the recording medium.

40 Claims, 10 Drawing Sheets

U.S. PATENT DOCUMENTS

| | | | |
|---|---|---|---|
| 5,701,343 A * | 12/1997 | Takashima et al. | 705/51 |
| 6,170,060 B1 | 1/2001 | Mott et al. | |
| 6,385,596 B1 * | 5/2002 | Wiser et al. | 705/51 |
| 6,453,369 B1 | 9/2002 | Imamura et al. | |
| 6,681,015 B1 | 1/2004 | Hioki et al. | |
| 6,683,954 B1 * | 1/2004 | Searle | 380/30 |
| 6,738,877 B1 | 5/2004 | Yamakawa et al. | |
| 2001/0016836 A1 * | 8/2001 | Boccon-Gibod et al. | 705/51 |
| 2002/0004884 A1 | 1/2002 | Yamakawa et al. | |

FOREIGN PATENT DOCUMENTS

| | | |
|---|---|---|
| EP | 0915410 | 5/1999 |
| EP | 0 930 616 A2 | 7/1999 |
| JP | 10-208388 | 8/1998 |
| JP | 11-306672 * | 5/1999 |
| JP | 11-213554 | 8/1999 |
| JP | 11-238306 | 8/1999 |
| JP | 11-313282 | 11/1999 |
| JP | 2000-113587 | 4/2000 |
| JP | 2000-152209 | 5/2000 |
| JP | 2000-156036 | 6/2000 |
| JP | 2000-195161 | 7/2000 |
| WO | WO-99/18506 | 4/1999 |
| WO | WO 99/26373 | 5/1999 |
| WO | WO 00/29928 | 5/2000 |

OTHER PUBLICATIONS

Bramhill, I.D. et al.: "Challenges for copyright in a digital age" BT Technology Journal. BT Laboratories, GB, vol. 15, No. 2, Apr. 1, 1997, pp. 63-73, XP000703557, ISSN.

* cited by examiner

METHOD OF, AND APPARATUS FOR, RECORDING/REPRODUCING DATA TO/FROM RECORDING MEDIUM HAVING COPYRIGHT MANAGEMENT DATA RECORDED THEREIN

TECHNICAL FIELD

The present invention generally relates to a data output apparatus and method, data input apparatus and method, data input/output apparatus and method, data transmission system and a data reception system, capable of inputting/outputting a content data whose copyright has to be managed, such as audio data, image data, moving-picture data, game program, computer program, etc. while managing the copyright, and to a content data with owner identification information.

BACKGROUND ART

Conventionally, a content data such as audio data, image data, moving-picture data, game program, computer program, etc. is recorded in a recording medium such as an optical disc, tape cassette or the like for commercial distribution, and a user having purchased the recording medium can permanently reproduce the content data from the recording medium.

For example, in the field of commercial distribution of an audio data via a network such as the Internet, the audio data is encrypted for distribution from a server to each terminal unit. The user wanting to reproduce the audio data at his own terminal unit will buy an encryption key to decrypt the encrypted audio data, that is, he or she will download the encryption key by paying a due compensation or money for the encryption key and store it in his or her storage unit such as a hard disc, nonvolatile memory or the like, while the audio data serving side will be able to receive a compensation for the audio data. In this case, the user will have to decrypt the encrypted audio data downloaded using the encryption key stored in his storage unit in order to permanently enjoy the audio data.

However, many such users own a plurality of audio data players such as a personal computer, stationary player, on-vehicle player, portable player and the like. With the above-mentioned copyright management system, however, the users going to enjoy such an audio data can only reproduce the encrypted audio data by his own player in which an encryption key for the audio data is stored.

To reproduce an encrypted audio data by a player owned by a user going to enjoy the audio data and which has not stored therein any encryption key for the audio data, it has been proposed to connect a player the user is going to use to a one having the encryption key stored therein via a network and thus use the encryption key in common between the player the user is going to use and a one having the encryption key stored therein. Besides, it has also been proposed to design a removable storage unit having the encryption key stored therein and for the user of a player to connect the removable storage unit to his own player. In any case, the user has to build the network or carry on the storage unit having the encryption key stored therein, which will make it complicated or troublesome for the user to enjoy such an audio data.

To solve the above problems, there is currently available a system by which only a player having downloaded an encrypted audio data can decrypt the audio data with an encryption key for reproduction of the audio data. However, it is desirable that any player owned by a user having purchased an audio data can always reproduce the audio data only if the reproduction is limited to a range of private use by the user.

DISCLOSURE OF THE INVENTION

Accordingly, the present invention has an object to overcome the above-mentioned drawbacks of the prior art by providing a data output apparatus and method, data input apparatus and method, data input/output apparatus and method, data transmission system and a data reception system, capable of allowing, identifying the owner of a content data, to send the content data to any of players the user owns and receive the thus sent content data for use within a range of private use, and to a content data with owner identification information.

The present invention has another object to provide a data output apparatus and method, data input apparatus and method, data input/output apparatus and method, data transmission system and a data reception system, capable of making a charge to the user for a use of a content data beyond a range of private use, and to a content data with by owner identification information.

The present invention has a still another object to provide a data output apparatus and method, data input apparatus and method, data input/output apparatus and method, data transmission system and a data reception system, capable of encrypting a content data with information for identification of an owner of the content data to permit only the owner to record or reproduce the content data to or from the apparatus, to a content data with owner identification information.

The above object can be attained by providing a method of recording data to a recording medium, including steps of detecting, when a recorder is going to record data to the recording medium, whether a terminal unit with a memory having user identification information recorded therein is connected, exchanging, when it is detected that the terminal unit is connected, an encryption key between the recorder and terminal unit, encrypting the user identification information read from the memory with the exchanged encryption key and sending it from the terminal unit to the recorder, and encrypting the data to be recorded to the recording medium with the user identification information sent from the terminal unit and recording the encrypted data to the recording medium.

Also the above object can be attained by providing a playback method of decrypting encrypted data read from a recording medium, including steps of detecting, when a player is going to play back the recording medium having recorded therein user identification information intended to identify the user and data encrypted with the user identification information, whether a terminal unit with a memory having the user identification information recorded therein is connected to the player, exchanging, when it is detected that the terminal unit is connected, an encryption key between the player and terminal unit, encrypting the user identification information read from the memory with the exchanged encryption key and sending it from the terminal unit to the player, judging whether the user identification information sent from the terminal unit is coincident with that read from the recording medium, and decrypting the encrypted data read from the recording medium when it is judged that the user identification information sent from the terminal unit is coincident with that read from the recording medium.

Also the above object can be attained by providing a method of playing back a recording medium, including steps of judging, when a player is going to play back a recording medium having recorded therein data having buried therein user identification information intended to identify the user and which have been encrypted with the user identification information, whether user identification information read from an information holder provided in the player to hold user identification information sent from a terminal unit is coincident with user identification information read from the recording medium, and decrypting the encrypted data read from the recording medium when the user identification information read from the information holder is coincident with that read from the recording medium.

Also the above object can be attained by providing a data transmitting method, wherein: it is judged, when an output unit to output data read from a recording medium having recorded therein data having buried therein user identification information intended to identify the user and which have been encrypted with the user identification information, is going to output data read from the recording medium, whether user identification information supplied from a terminal unit with a memory having the user identification information stored therein is coincident with that read from the recording medium; when it is judged that the user identification information supplied from the terminal unit is coincident with that read from the recording medium, the output unit sends, to a server, the user identification information showing the coincidence; the server sends, to the output unit, a reference number based on the received user identification information; and the output unit buries the received reference number into the data read from the recording medium and sends it to the server.

Also the above object can be attained by providing a method of controlling data recording, wherein: there is sent, upon request for sending data stored in a storage unit provided in a server and which has stored therein a plurality of data having at least buried therein user identification information intended to identify the user and which have been encrypted with the user identification information, the requested data to a recorder; the recorder extracts the user identification information from the received data; it is judged whether the extracted user identification information is coincident with user identification information held in an information holder provided in the recorder; and the recorder records the received data to the recording medium when the extracted user identification information is coincident with the user identification information held in the information holder in the recorder.

Also the above object can be attained by providing a data transmitting/receiving method, wherein: it is judged, when a recorder/player outputs data read from a recording medium having recorded therein data having buried therein user identification information intended to identify the user and which have been encrypted with the user identification information, whether the user identification information supplied from a terminal unit having a memory having user identification information recorded therein is coincident with the user identification information read from the recording medium; when it is judged that the user identification information supplied from the terminal unit is coincident with that read from the recording medium, the recorder/player sends, to a server, the user identification information showing the coincidence; the server sends, to the recorder/player, a reference number based on the received user identification information; the recorder/player buries the received reference number into the data read from the recording medium, sends it to the server and stores it into a storage unit provided in the server; there is sent, upon request for sending stored in the storage unit in the server, the requested data to the recorder/player; the recorder/player extracts the user identification information from the received data; it is judged whether the extracted identification information is coincident with that stored in the memory in the terminal unit; and the recorder/player records the received data to the recording medium when it is judged that the extracted user identification information is coincident with that stored in the memory.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described below concerning a content distribution system with reference to the accompanying drawings. The content distribution system is generally indicated with a reference 1.

Figure 1:
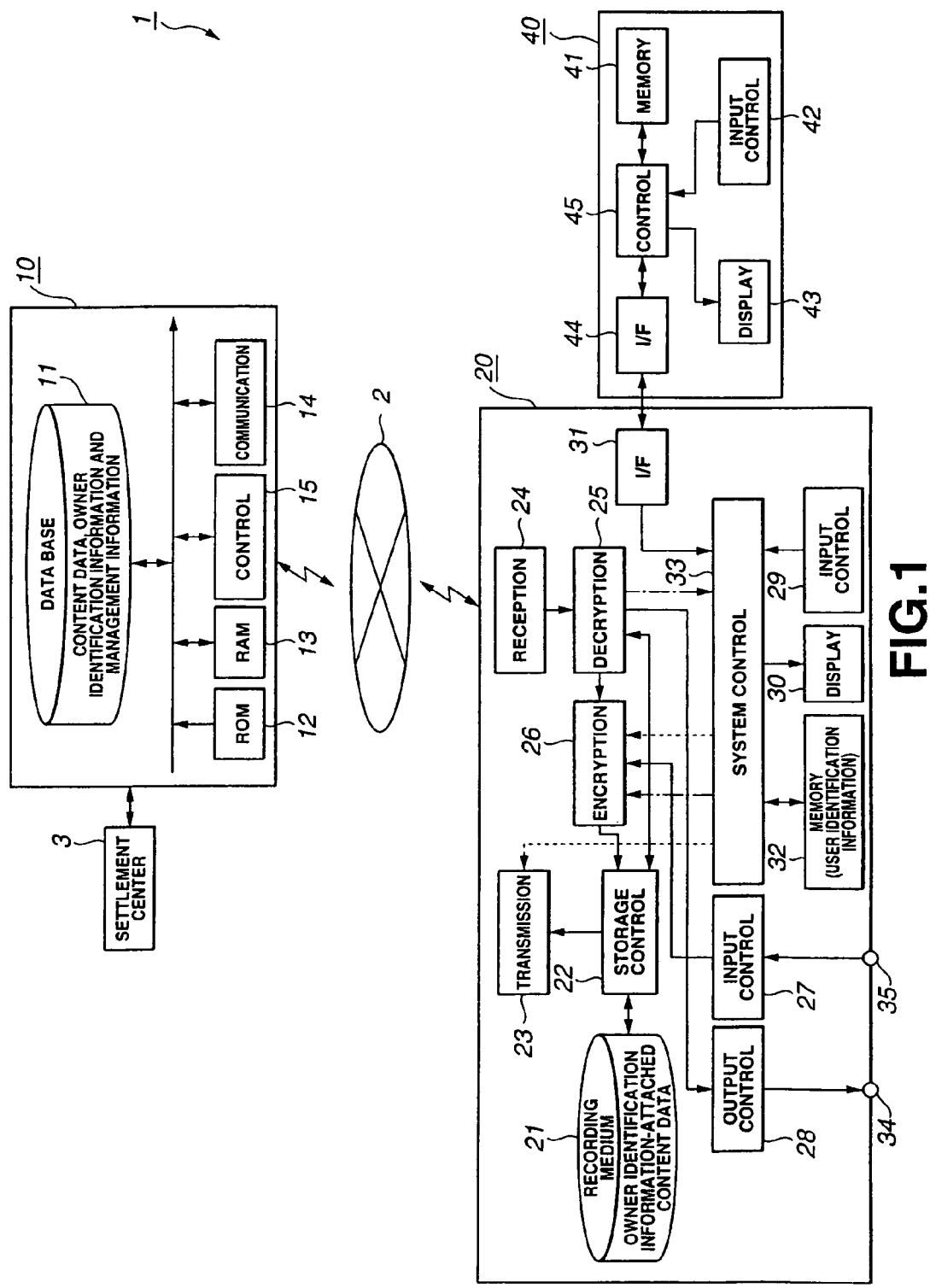
FIG. 1 is a block diagram of a content distribution system according to the present invention.

As shown in FIG. 1, the content distribution system 1 includes a server 10 which distributes a content data, and a data recorder/player 20 capable of uploading a content data stored therein to the server 10 and downloading a content data stored in the server 10.

The data recorder/player 20 is connected to the server 10 in a network 2 via a telecommunication line such as ISDN (integrated services digital network) line, CATV (cable television) line, optical cable line or the like. The content distribution system 1 is adapted to send a content data stored in a source data recorder/player 20 to a destination data recorder/player 20. The server 10 is connected to a settlement center 3 such as a credit card company or the like to make a charge to a grantee for a content data transferred to the latter.

As shown in FIG. 1, the server 10 to distribute a content data is similarly configured to an ordinary computer, including a storage unit 11 having stored therein a data base of owners of content data, a read-only memory (will be referred to simply as "ROM" hereunder) 12 having stored therein a control program under which the operation of the entire server and the like are controlled, a random access memory (will be referred to simply as "RAM" hereunder) 13 to which programs stored in the storage unit 11 and ROM 12 are loaded, a communication unit 14 which sends and receives a content data, etc. to and from the data recorder/player 20, and a controller 15 which controls the operation of the entire server based on the programs stored in the ROM 12 and loaded to the RAM 13.

The storage unit 11 is a large-capacity hard disc, for example. In this embodiment, the storage unit 11 has a data base constructed therein and stores a content data uploaded from the data recorder/player 20. More specifically, in this data base, a content data uploaded from the data recorder/player 20, owner identification information indicating an owner of the content data, and management information intended to manage the uploaded content data are correlated with each other. The management information is added when uploading the content data.

The controller 15 receives, at the communication unit 14, a content data attached to an electronic mail or the like sent from the data recorder/player 20, adds management information to the received content data and register it into the data base constructed in the storage unit 11. When the communication unit 14 has received a request for downloading from the data recorder/player 20 to which the electronic mail is addressed, the controller 15 sends a content data along with the electronic mail from the communication unit 14 to the data recorder/player 20. The server 10 distributes a content data, and when the distributed content data is owned by any other person, the server 10 will make a charge to the new owner for the received content data. The server 10 sends the charging data to the settlement center 3.

The data recorder/player 20 which uploads a content data etc. to the server 10 having the aforementioned functions includes a recording medium 21 to which a content data with a plurality of owner identification information is recorded, a storage controller 22 to write and read data such as content data to and from the recording medium 21, a transmission unit 23 to send, to the server 10, the owner identification information-attached content data read by the storage controller 22, a reception unit 24 to receive the owner identification information-attached content data sent from the server 10, a decryption unit 25 to decrypt the owner identification information-attached content data received by the reception unit 24, and an encryption unit 26 to encrypt the owner identification information-attached content data decrypted by the decryption unit 2. The data recorder/player 20 includes an input controller 27 to control input of a digital or analog content data from any other data recorder/player, and an output controller 28 to control output of a content data to a speaker, earphone, headphone or the like. Furthermore, the data recorder/player 20 includes an input controller 29 to input control signals, a display unit 30 to display the operating state of the data recorder/player, an interface (will be referred to simply as "I/F" hereunder) 31 to which an input unit which inputs information for identification of the user of the data recorder/player, a memory 32 to store user identification information supplied from the I/F 31, and a system controller 33 to control the operation of the data recorder/player.

The recording medium 21 is an optical disc, magneto-optical disc, hard disc, semiconductor memory or the like, for example, to record an owner identification information-attached content data encrypted with the content data owner identification information. The owner identification information-attached content data recorded to the recording medium 21 is audio data, video data, moving-picture data, game program, computer program or the like. The owner identification information-attached content data has content data owner identification information buried therein by digital watermarking. The owner identification information may be stored in the header of a content data. The storage controller 22 is provided to write a content data or the like to the recording medium 21 and read a content data from the recording medium 21. Note that the recording medium 21 may be of a removable type which can be loaded into and removed from the data recorder/player or of a built-in type which is incorporated in the data recorder/player.

The storage controller 22 controls write of content data or the like to the recording medium 21 and read of content data or the like from the recording medium 21. That is, before recording a content data or the like to the recording medium 21, the storage controller 22 adds error correction code to, and modulates, the content data to be recorded, and after reading a content data from the recording medium 21, the storage controller 22 demodulates, and makes error correction of, the read content data.

The transmission unit 23 is based on a transmission protocol such as TCP/IP (transmission control protocol/internet protocol) to send an electronic mail and owner identification information-attached encrypted content data to the server 10. More particularly, the transmission unit 23 sends the owner identification information-attached encrypted content data when information for identification of the owner of a content data to be sent and information for identification of the data recorder/player, stored in the memory 32, are coincident with each other.

The reception unit 24 is provided to receive an electronic mail, owner identification information-attached content data, etc. addressed to itself and sent from the server 10, and output them to the decryption unit 25. Also, the reception unit 24 receives information for identification of the addressor of a content data, which is used as an encryption key to decrypt received an owner identification information-attached encrypted content data addressed to itself for recording to the recording medium 21. The reception unit 24 outputs the encrypted owner identification information to the decryption unit 25.

The decryption unit 25 is provided to decrypt the owner identification information-attached content data received by the reception unit 24. That is, when storing downloaded content data into the recording medium 21, the decryption unit 25 decrypts the content data with content data addressor identification information (will also be referred to as "content data owner" hereunder). The decryption unit 25 outputs the decrypted content data to the encryption unit 26 in order to re-encrypt the decrypted content data with its own owner identification information. The decryption unit 25 decrypts the owner identification information in the owner identification information-attached content data read by the storage controller 22 from the recording medium 21, and outputs the decrypted owner identification information to the system controller 33. The decryption unit 25 outputs the decrypted content data to the output controller 28 for reproduction of the content data.

The encryption unit 26 is provided to encrypt the content data decrypted by the decryption unit 25 using, as an encryption key, the owner identification information being information for identification of the addressee of a content data, stored in the memory 32. At this time, the encryption unit 26 encrypts also the owner identification information used as the encryption key. The encryption unit 26 outputs, to the storage controller 22, the content data and owner identification information encrypted with the new owner identification information. Also, the encryption unit 26 encrypts a content data supplied from any other external device with the owner identification information and also encrypts the owner identification information used as the encryption key, and outputs them to the storage controller 22.

The output controller 28 is connected to an output terminal 34 connect to an output device such as a speaker, earphone, headphone, monitor or the like. The output controller 28 is provided to demodulate, for example, a content data supplied from the decryption unit 25 and converts digital signals to analog signals for delivery to outside.

The input controller 29 is connected to an input terminal 35 connected to an external device such as a content data player or the like. When supplied with a content data from the external device, the input controller 29 converts, for example, analog signals to digital signals for delivery to the decryption unit 25.

The input controller 29 includes an input unit such as a keyboard, ten key pad, mouse, joystick, pushbuttons or the like to output a control signal generated in response to an operation made by the user to the system controller 33. For example, the input controller 29 is operated by the user to input an electronic mail address and the like and send and receive a content data and electronic mails. The input controller 27 selects a to-be-sent one from a content data recorded in the recording medium 21.

The display unit 30 is a cathode ray tube, liquid crystal display panel or the like to indicate an operation of the data recorder/player. For example, when the content data is a video data or moving-picture data, the display unit 30 provides an indication depending upon the video data, and when the content data is an audio data, the display unit 30 indicates a replay time or the like. When the user makes any erroneous operation while operating the data recorder/player, the display unit 30 indicates an alarm or warning. Further, the display unit 30 displays a list of a plurality of content data stored in the recording medium 21. Thus, the user can use the input controller 29 to select a to-be-sent content data on the basis of the content data list displayed on the display unit 30.

The I/F 31 is connected to an input unit 40 provided to enter user identification information. The input unit 40 is accessory to the data recorder/player 20, and it is formed to have a size permitting the user to carry it on. As shown, the input unit 40 includes a memory 41 having recorded therein identification information unique to the input unit, an input controller 42 to input a user name and the like, a display unit 43 to indicate the operating state and the like, an I/F 44 provided to sent and receive data to and from the data recorder/player 20, and a controller 45 to control the operation of the entire input unit 40.

The memory 41 is formed from a nonvolatile memory, for example, and it has identification information unique to the input unit recorded therein. The identification information unique to the input unit has been recorded to the memory 41 at the time of shipment from factory, for example. Also, the memory 41 stores the user name supplied from operating the input controller 42.

The input controller 42 is a pushbutton switch, rotary switch, rotatable switch, keyboard, ten key pad or the like, and the display unit 43 is a liquid crystal display panel, for example. The user can enter his name from the input controller 42 while viewing the display unit 43.

The controller 45 is provided to control the entire input unit 40 to record a user name, for example, entered by operating the input controller 42 to the memory 41. When sending, to the I/F 31 in the data recorder/player 20, user name and identification information unique to the data recording/player 20 as information for identification of the user of the data recorder/player 20, the controller 45 first exchanges an encryption key intended for use to encrypt and decrypt data with the data recorder/player 20, encrypts the user name and unique identification data, and delivers at the I/F 44 to the I/F 31 of the data recorder/player 20.

Note that the input unit 40 may be adapted to input user identification information generated based on biometric information such as a fingerprint, voice print or the like to the data recorder/player 20.

After exchanging the encryption key for the data security with the I/F 44 of the input unit 40, the I/F 31 of the data recorder/player 20 is supplied with the user identification information including the identification information unique to the input unit and user name and having been encrypted with the encryption key, from the input unit 40.

The memory 41 of the data recorder/player 20 is for example a nonvolatile memory o store the user identification information supplied from the input unit 40. The user identification information will be owner identification information used as an encryption key when a content data is encrypted.

The system controller 33 is provided to the entire system. That is, when uploading an owner identification information-attached content data recorded in the recording medium 21 to the server 10, the system controller 33 compares the content data owner identification information supplied from the storage controller 22 with user identification information stored in the memory 32 to judge whether these pieces of identification information are coincident with each other, and allows the transmission unit 23 to send the owner identification information-attached content data only when the pieces of information are coincident with each other. That is, the system controller 33 is adapted to send only content data the addressor owns. Upon reception of the owner identification information-attached content data from the server 10, the system controller 33 compares the content data owner identification information supplied and received from the decryption unit 25 with the user identification information stored in the memory 32, and allows to record the content data to the recording medium 21 when the pieces of information are coincident with each other, while requesting the server 10 to acquire the owner identification information for identification of the addressor of the content data when there is no coincidence between the pieces of identification information. Further, supplied with encrypted user identification information from the input unit 40 via the I/F 31, the system controller 33 decrypts the user identification information and stores it into the memory 32.

Figure 2:
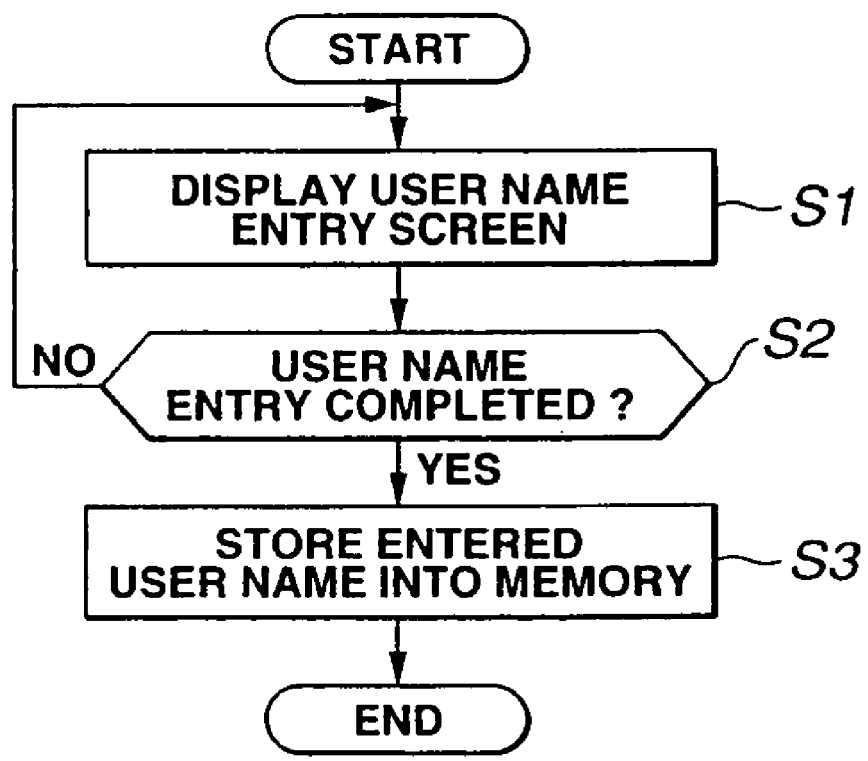
FIG. 2 shows a flow of operations made in registration of a user name into an input unit.

Next, a series of operations made to register a user name in the input unit 40 and then to the data recorder/player 20 will be described with reference to the flow charts shown in FIGS. 2 to 4.

To start with, a procedure for registration of a user name into the input unit 40 will be described with reference to the flow chart shown in FIG. 2. First in step S1, the controller 45 displays, at the display unit 43, a screen for entry of a user name to prompt the user to enter his or her name. At this time, the user enters his name by operating the input controller 42. Next in step S2, the controller 45 judges whether the user has entered his name. When the user has entered his name, the controller 45 goes to step S3. On the other hand, if the user has not yet entered his name, the controller 45 repeats the operation as in step S2. In step S3, the controller 45 stores the entered user name into the memory 41. Thus, the user will be able to carry on the input unit 40 having the user name been registered therein and load it into any of the data recorder/players 20 located different places, and output a content data owned by himself and stored in the recording medium 21 in the data recorder/player 20 in which the input unit 40 is thus loaded, and also send the content data to another data recorder/player 20.

Next, a procedure for registering the user identification information stored in the input unit 40 into the data recorder/player 20 will be described with reference to the flow charts shown in FIGS. 3 and 4. First in step S11 in the flow chart shown in FIG. 3, the controller 45 in the input unit 40 will judge whether the I/F 44 is connected to the I/F 31 in the data recorder/player 20. When the I/F 44 is found connected, the controller 45 goes to step S12. On the other hand, if the I/F 44 is not yet connected, the controller 45 will go to step S13 where it will display, on the display unit 43, the fact that the I/F 44 has not yet been connected to the I/F 31, and also sounds a warning to inform the user of the fact.

In step S12, the controller 45 judges whether the user has registered the user identification information into the data recorder/player 20 by operating the input controller 42. When it has judged that the user has so registered the user identification information, it will go to step S14. On the other hand, if the user identification information has not yet been registered into the data recorder/player 20, the controller 45 will repeat the operation as in step S12.

In step S14, the controller 45 judges whether the input unit 40 has been authenticated by the data recorder/player 20 connected to the input unit 40. When the controller 45 judges that the input unit 40 has been authenticated by the data recorder/player 20, it goes to step S15. On the other hand, if the input unit 40 has not successfully been authenticated by the data recorder/player 20, the controller 45 goes to step S16 where it will exit the procedure with displaying, on the display unit 43, a message that the input unit 40 has not successfully been authenticated by the data recorder/player 20.

If the authentication by the data recorder/player 20 has successfully been acquired in step S15, the controller 45 exchanges an encryption key with the data recorder/player 20. That is, the encryption key is used to enable the data recorder/player 20 as an addressee of the user identification information to decrypt the encrypted user identification information sent to the data recorder/player 20. And the controller 45 goes to step S17.

In step S17, the controller 45 reads, from the memory 41, the user name being user identification information and identification information unique to the input unit 40 and encrypts these pieces of information. The controller 45 sends a request for registration of the user identification information along with the encrypted user identification information to the I/F 31 of the data recorder/player 20 via the I/F 44.

Figure 3:
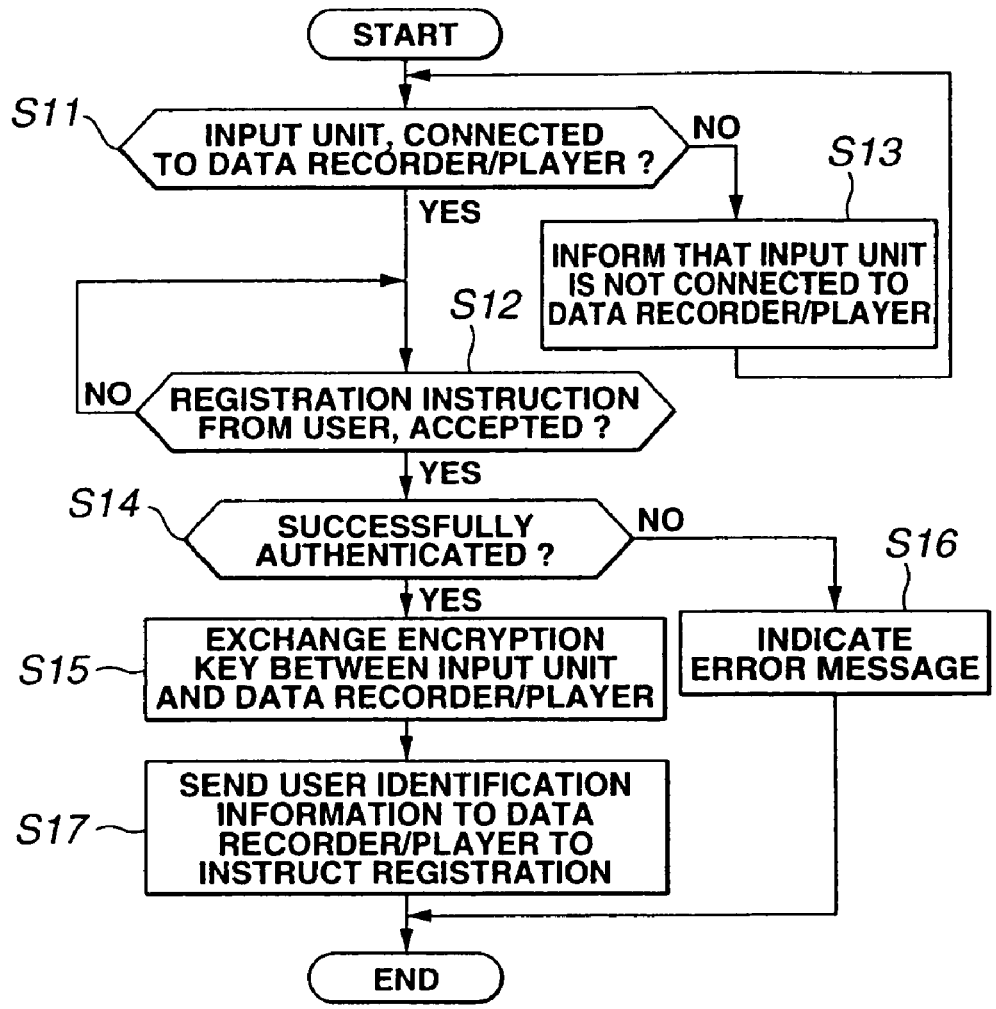
FIG. 3 shows a flow of operations made by the input unit when registering user identification information into a data recorder/player.
Figure 4:
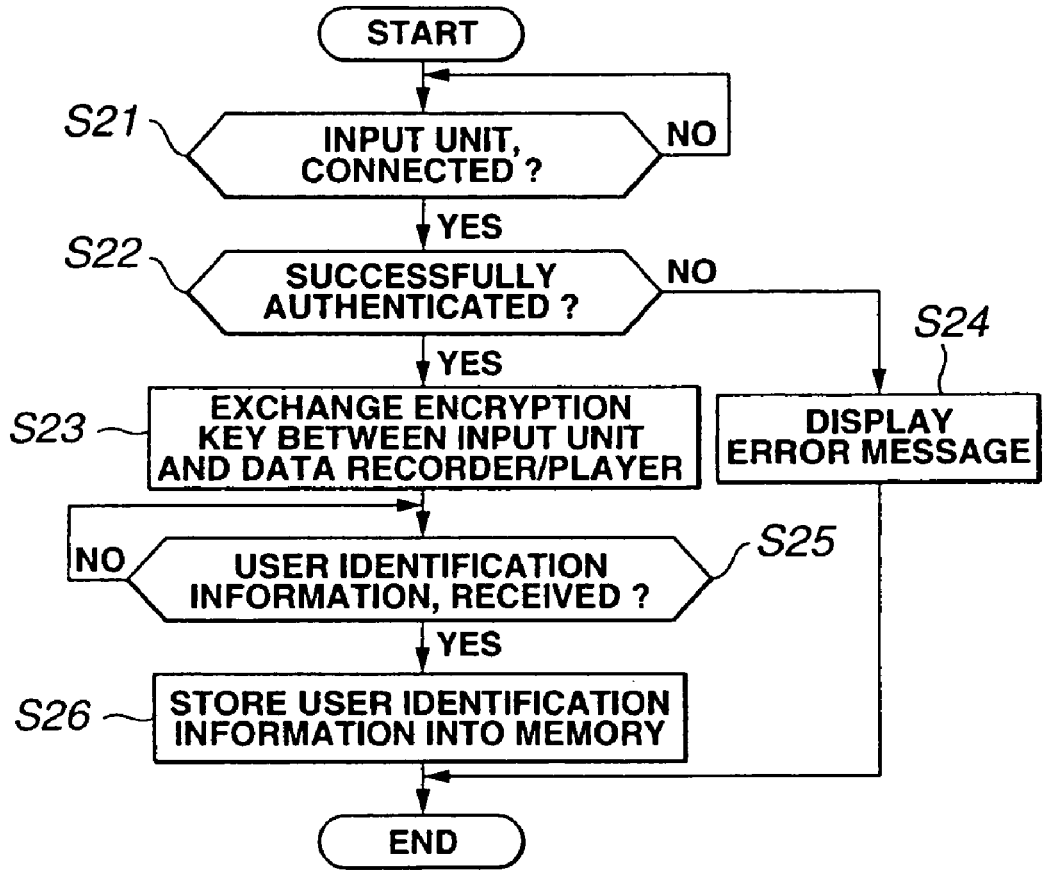
FIG. 4 shows a flow of operations made by the data recorder/player when registering the user identification information into the data recorder/player.

When the input unit 40 effects the operations shown in FIG. 3, the system controller 33 in the data recorder/player 20 detects in step S21 in FIG. 4 whether the I/F 44 of the input unit 40 is connected to the I/F 31 of the data recorder/player 20. If the I/F 44 is detected to have been connected to the I/F 31, the system controller 33 goes to step S22. On the other hand, if the I/F 44 is not yet connected to the I/F 31, the system controller 33 will repeat the operation in step S21. In step S22, the system controller 33 authenticates the input unit 40 connected to the I/F 31. When it has successfully authenticated the input unit 40, it goes to step S23. On the other hand, if the input unit 40 has not successfully been authenticated, the system controller 33 goes to step S24 where it will exit the procedure with displaying, on the display unit 30, a message that the connected input unit 40 has not successfully been authenticated.

In step S23, the system controller 33 will exchanges an encryption key with the input unit 40. Then in step S25, the system controller 33 judges whether the user identification information has been received from the input unit 40. When the user identification information has been received, the system controller 33 goes to step S26. On the other hand, if no user identification information has been received, the system controller 33 will repeat the operation as in step S25.

In step S26, the system controller 33 decrypts the user identification information supplied from the I/F 31 with the encryption key having been acquired in step S23, and then stores the decrypted user identification information into the memory 32.

Thus, the user has registered his own user identification information from the input unit 40 into the data recorder/player 20, whereby he is allowed to output his own content data from any of the different data recorder/players 20. Even if the user identification information thus registered into the data recorder/player 20 is a one having once been registered, the user can use the input unit 40 to re-register the user identification information as any other one by following the aforementioned procedure.

Figure 5:
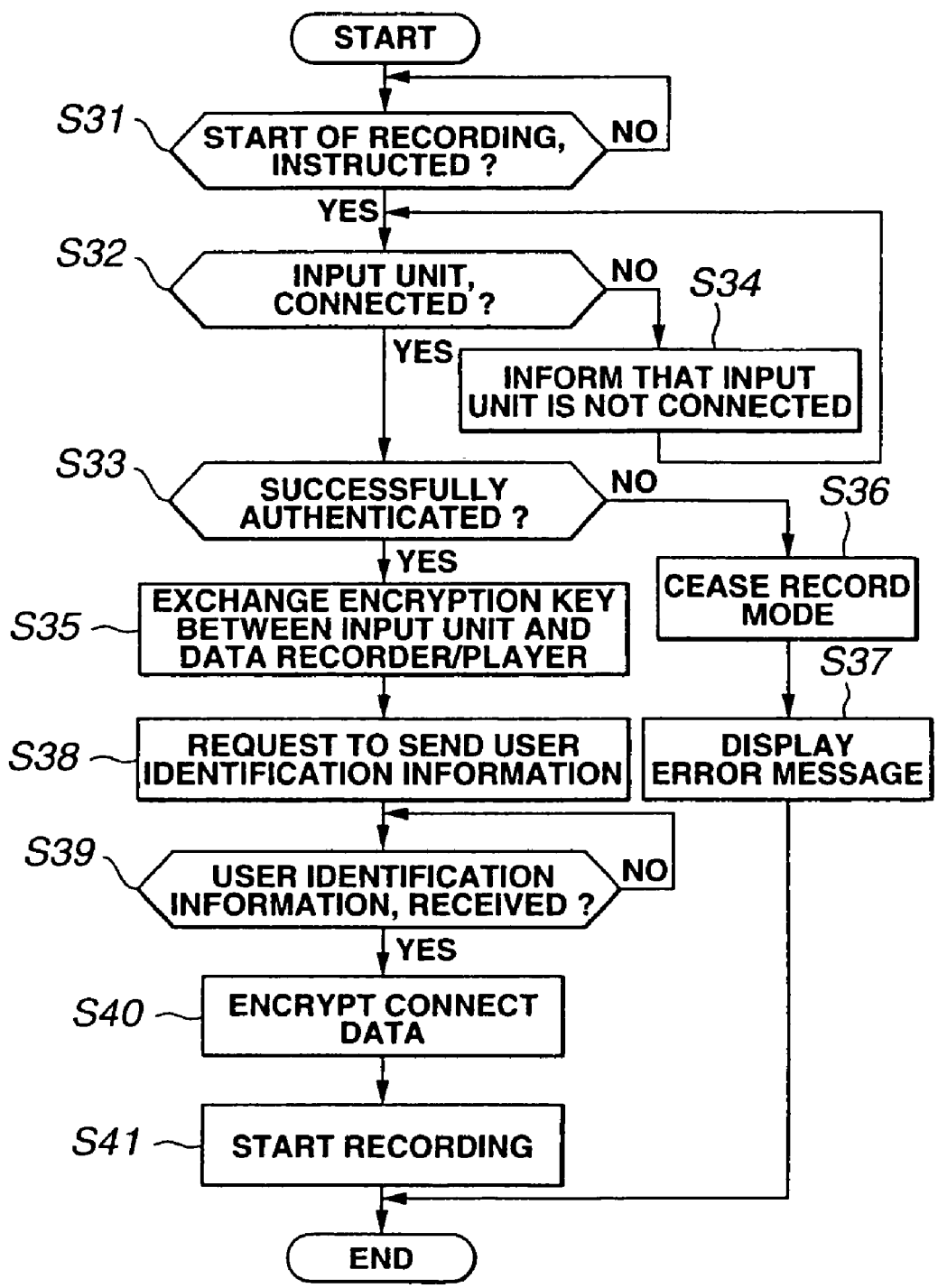
FIG. 5 shows a flow of operations made in recording a content data to the data recorder/player.

Next a procedure for recording a content data to the aforementioned data recorder/player 20 will be described with reference to the flow chart shown in FIG. 5. First in step S31, the system controller 33 judges, correspondingly to an operation by the user, whether a recording start signal has been supplied from the input controller 27. When the recording start signal is detected in step S32, the system controller 33 goes to step S32. On the other hand, if no recording start signal is detected in step S32, the system controller 33 will repeat the operation as in step S31.

In step S32, the system controller 31 judges whether the I/F 44 of the input unit 40 is connected to the I/F 31 of the data recorder/player 20. When it is judged in step S32 that the I/F 44 is not connected, the system controller 33 goes to step S34 where it will return to step S32 with displaying, on the display unit 30, a message that the input unit 40 is not connected, to thereby inform the user of the fact.

In step S33, the system controller 33 authenticates the input unit 40 connected to the I/F 31. When the input unit 40 has successfully been authenticated, the system controller 33 goes to step S35. On the other hand, if the input unit 40 has not successfully been authenticated in step S33, the system controller 33 goes to step S36 where it will exit the content data record mode, and then goes to step S37 wherein it will exit the procedure with displaying, on the display unit 30, a message that the input unit 40 has not successfully been authenticated.

In step S35, the system controller 33 exchanges an encryption key with the input unit 40 to encrypt the user identification information with the exchanged encryption key for assuring the security of data transfer. In step S38, the system controller 33 requests the input unit 40 to send the user identification information. In step S39, the system controller 33 judges whether the user identification information has been received from the input unit 40. When the user identification information has been received, the system controller 33 goes to step S40. On the other hand, if the user identification information has not been received, the system controller 33 will repeat the operation in step S39.

In step S40, the system controller 33 encrypts a content data with the user identification information supplied from the input unit 40. That is, the content data to be recorded is supplied from an external device connected to the input terminal 35 to the input controller 27, and the latter outputs the content data to be recorded to the recording medium 21 to the encryption unit 26. The system controller 33 changes the user identification information supplied from the input unit 40 to content data owner identification information and outputs the owner identification information to the encryption unit 26. The encryption unit 26 uses the owner identification information as an encryption key to encrypt the content data and also the owner identification information, and outputs these pieces of information to the storage controller 22.

In step S41, the system controller 33 controls the storage controller 22 to bury the encrypted owner identification information into the encrypted content data, and records the encrypted content data having the owner identification information buried therein to the recording medium 21.

Thus, since the encrypted content data is recorded to the recording medium 21, the content data can be concealed more effectively. Also, since the content data having the owner identification information attached thereto is recorded to the recording medium 21, the owner of the content data can be made definite, so that content data of a plurality of owners can be recorded with no confusion between them.

Figure 6:
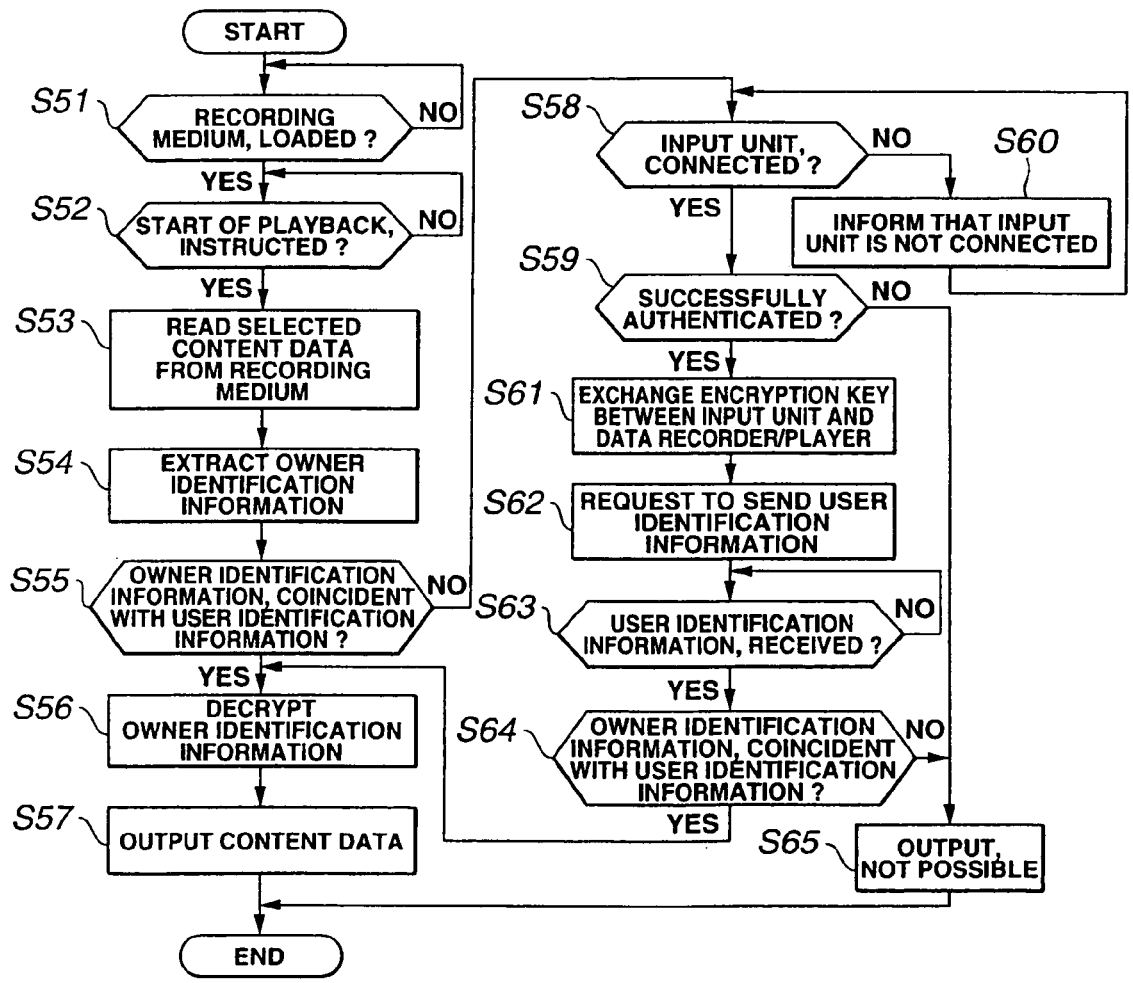
FIG. 6 shows a flow of operations made in the data recorder/player when reproducing a content data.

Next, a procedure for reproducing a content data stored in the recording medium 21 in the data recorder/player 20 will be described with reference to the flow chart shown in FIG. 6. First in step S51, the system controller 33 judges, when the recording medium 21 is removably installable to the data recorder/player, whether the recording medium 21 is loaded in the data recorder/player. When the recording medium 21 is loaded in the data recorder/player, the system controller 33 goes to step S52. On the other hand, if the recording medium 21 is not loaded, the system controller 33 will repeat the operation as in step S51.

In step S51, it may be judged whether the recording medium 21 is loaded in the data recorder/player, by various methods such as detecting a return light from the recording medium 21 which is an optical disc, for example, an optical disc, using a sensor switch or the like.

In step S52, the system controller 33 judges whether playback start signal has been supplied from the input controller 27 correspondingly to an operation of the input unit 40 by the user. When the playback start signal has been detected, the system controller 33 goes to step S53. If the playback start signal has not been detected, the system controller 33 will repeat the operation as in step S52.

In step S53, the storage controller 22 is controlled by the system controller 33 to read the owner identification information-attached content data selected by the input controller 27 from the recording medium 21. In step S54, the storage controller 22 extracts the owner identification information from the owner identification information-attached content data, and outputs it to the decryption unit 25. The decryption unit 25 decrypts the owner identification information, and outputs it to the system controller 33.

In step S55, the system controller 33 reads user identification information from the memory 32 and compares it with owner identification information supplied from the decryption unit 25. When the owner identification information extracted from the content data is found coincident with the user identification information read from the memory 32, the system controller 33 goes to step S56. On the other hand, if there is found no coincidence between these pieces of identification information, the system controller 33 goes to step S58 where it will judge whether the content data to be read from the recording medium 21 is owned by the user of the data recorder/player 20.

In step S56, the storage controller 22 outputs the content data to the decryption unit 25. The decryption unit 25 will decrypt the content data having been encrypted with the owner identification information, and outputs the decrypted content data to the output controller 28.

In step S57, the decryption unit 25 is controlled by the system controller 33 to output the decrypted content data from the output controller 28 to an output device, such as a speaker, earphone, headphone, monitor or the like, connected to the output terminal 34. Thus, the user can output his own content from the data recorder/player 20.

If the system controller 33 has judged in step S55 that the owner identification information extracted from the content data is not coincident with the user identification information read from the memory 32, it goes to step S58 where it will judge whether the I/F 44 of the input unit 40 is connected to the I/F 31 of the data recorder/player 20. When the I/F 44 is found connected to the I/F 31, the system controller 33 goes to step S59. On the other hand, if it is judged that the I/F 44 is not connected to the I/F 31, the system controller 33 will go to step S60 where it will return to step S58 with displaying, on the display unit 30, a message that the input unit 40 is not connected.

In step S59, the system controller 33 authenticates the input unit 40 connected to the I/F 31. When the system controller 33 has successfully authenticated the input unit 40, it goes to step S61. On the other hand, the system controller 33 has failed in the authentication, it goes to step S65.

In step S61, the system controller 33 exchanges an encryption key with the input unit 40 and makes it possible to exchange user identification information having been encrypted with the exchanged encryption key. In step S62, the system controller 33 requests the input unit 40 to send the user identification information. In step S63, the system controller 33 judges whether the user identification information has been received from the input unit 40. When the user identification information has been received, the system controller 33 goes to step S64. If the user identification information has not been received, the system controller 33 will repeat the operation as in step S63.

In step S64, the system controller 33 compares the user identification information supplied from the input unit 40 with the owner identification information supplied from the decryption unit 25. When the owner identification information extracted from the content data in step S64 is coincident with the user identification information supplied from the input unit 40, the system controller 33 goes to step S56. The decryption unit 25 decrypts the encrypted content data and outputs the decrypted content data to the output controller 28. Also, when the user identification information from the input unit 40 is not coincident with the owner identification information from the decryption unit 25, the system controller 33 goes to step S65 where it will inhibit the storage controller 22 from outputting any content data to the decryption unit 25. Note that in step S65, the storage controller 22 has not to be inhibited from outputting content data but may be allowed to reproduce a content data a limited number of times, for example, n times (so-called "demonstration (=test-listen)" mode).

That is, in step S64, the system controller 33 judges whether the content data read from the recording medium 21 is owned by the user of the data recorder/player 20.

The aforementioned method of controlling content data reproduction makes it possible, in principle, to output a content data when user identification information registered in the memory 32 is coincident with content data owner identification information. So, the user has not to carry on the input unit 40, which improves very much the system operability. The above method allows the user to output his own content data from the data recorder/player 20 by connecting the input unit 40 to the data recorder/player 20 even when the user identification information registered in the memory 32 is not coincident with the content data owner identification information. As above, the content data reproduction controlling method according to the present invention allows the user to reproduce only his own content data, to thereby limit the use of a content data to within the range of private.

Figure 7:
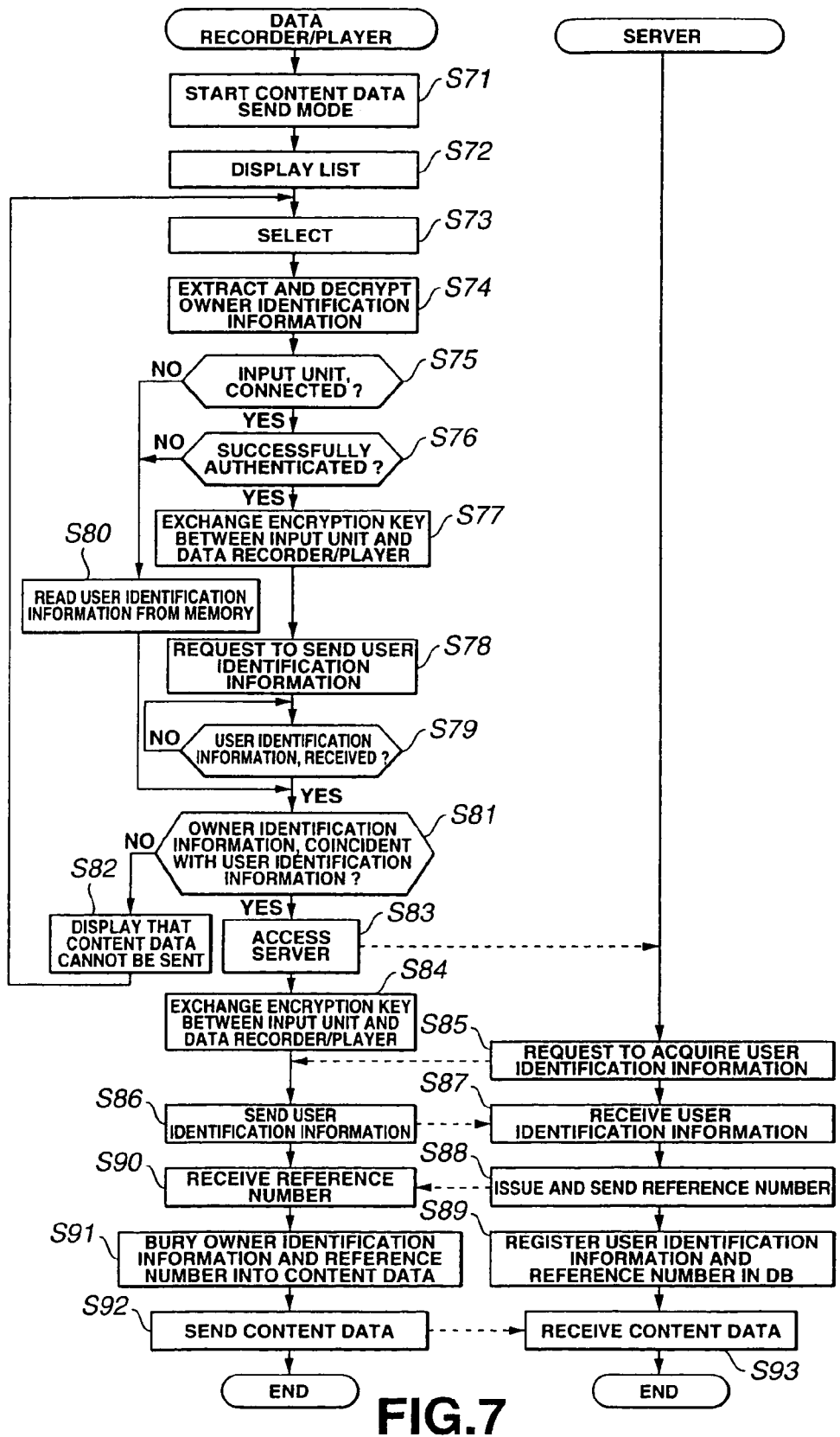
FIG. 7 shows a flow of operations made in uploading a content data from the data recorder/player to a server.

Next, there will be described with reference to the flow chart shown in FIG. 7 a procedure for uploading a content data stored in the recording medium 21 to the server 10 when sending them to another data recorder/player 20.

First in step S71, the system controller 33 in the data recorder/player 20 being an addressor of a content data starts up a content data send mode in which any other data recorder/player 20 is addressed in response to an operation by the user of the input unit 40 and a content data is uploaded to the server 10 for sending to that data recorder/player 20. Next in step S72, the system controller 33 controls the display unit 30 to display a list of content data stored in the recording medium 21. The display unit 30 displays a list of titles and names of owners of the content data, for example. Then, as the input controller 29 is operated by the user, the system controller 33 moves the cursor on the display unit 30 to select a user-desired content data.

In step S74, the system controller 33 controls the storage controller 22 to read a user-selected owner identification information-attached content data from the recording medium 21, extracts the owner identification information from the content data, and outputs it to the decryption unit 25. The decryption unit 25 will decrypt the owner identification information and output the decrypted owner identification information to the system controller 33.

In step S75, the system controller 33 judges whether the I/F 44 of the input unit 40 is connected to the I/F 31 of the data recorder/player 20. When the I/F 44 is connected, the system controller 33 goes to step S76. On the other hand, if the I/F 44 is not connected, the system controller 33 will go to step S80. In step S76, the system controller 33 authenticates the input unit 40 connected to the I/F 31 in the data recorder/player 20. When the system controller 33 has successfully authenticated the input unit 40, it goes to step S77. On the other hand, if no authentication of the input unit 40 is successful, the system controller 33 will go to step S80. In step S77, the system controller 33 exchanges an encryption key with the input unit 40 and makes it possible to exchange user identification information having been encrypted with the exchanged encryption key. In step S78, the system controller 33 requests the input unit 40 to send the user identification information. In step S79, the system controller 33 judges whether the user identification information has been received from the input unit 40. When the user identification information has been received, the system controller 33 goes to step S81. If the user identification information has not been received, the system controller 33 will repeat the operation as in step S79.

When it is judged in step S75 that the input unit 40 is not connected to the I/F 31 or when no authentication of the input unit 40 has been acquired in step S76, the system controller 33 reads the user identification information from the memory 32 in step S80, and then goes to step S81.

In step S81, the system controller 33 compares the user identification information read from the input unit 40 or memory 32 with the content data owner identification information supplied from the decryption unit 25. When there is not coincidence between the owner identification information extracted from the content data and the user identification information read from the input unit 40 or memory 32, the system controller 33 goes to step S82. When these pieces of identification information are found coincident with each other, the system controller 33 will go to step S83. That is, in step S81, the system controller 33 allows the user to upload only his own content data to the server 10.

In step S82, the system controller 33 ceases the operation of sending the selected content data with displaying, on the display unit 30, a message to inform the user that the content data the user has selected cannot be sent, and also a prompt to have the user select another content data, and then returns to step S73.

In step S83, the system controller 33 accesses the server 10 via the transmission unit 23. The data recorder/player 20 and server 10 exchange encryption key with each other to enable safe exchange of user identification information between them.

In step S85, the server 10 requests the data recorder/player 20 to send user identification information, that is, content data owner identification information. In step S86, the system controller 33 in the data recorder/player 20 sends the content data owner identification information to the server 10 via the transmission unit 23. When the controller 15 in the server 10 has received, in step S87, the content data owner identification information from the data recorder/player 20 via the transmission unit 14, it issues a reference number for the content data the addressor is going to send, and sends the reference number from the communication unit 14 to the data recorder/player 20. In step S89, the server 10 registers the owner identification information and reference number into the data base constructed in the storage unit 11.

In step S90, the system controller 33 in the data recorder/player 20 receives, at the reception unit 24, the reference number sent from the server 10. The system controller 33 outputs the reference number received by the reception unit 24 to the storage controller 22.

In step S91, the system controller 33 in the data recorder/player 20 controls the storage controller 22 to bury the owner identification information and reference number into the encrypted content data going to be sent. In step S92, the storage controller 22 is controlled by the system controller 33 to output, to the transmission unit 23, the encrypted content data having the owner identification information and reference number buried therein. The system controller 33 sends, from the transmission unit 23 to the server 10, the encrypted content data in which the owner identification information and reference number have been buried. In step S93, the server 10 receives, at the communication unit 14 thereof, the encrypted content data send from the data recorder/player 20 and having the owner identification information and reference number buried therein. The server 10 stores the content data into the storage unit 11 thereof.

The data recorder/player 20 may be designed to send a content data having a message attached thereto. Also, the server 10 may be adapted to release the content data uploaded from the data recorder/player 20 on a home page to the users of this service access. The server 10 may be designed to issue a reference number and, in addition, a designated encryption key for use in uploading a content data, in step S88. In this case, the server 10 registers the encryption key along with owner identification information and reference number into the data base. The data recorder/player 20 uses the encryption key to re-encrypt the content data for sending to the server 10.

With the aforementioned content data uploading method, it is possible to upload a content data only when the owner of the content data is precisely the user of the data recorder/player 20.

Figure 8:
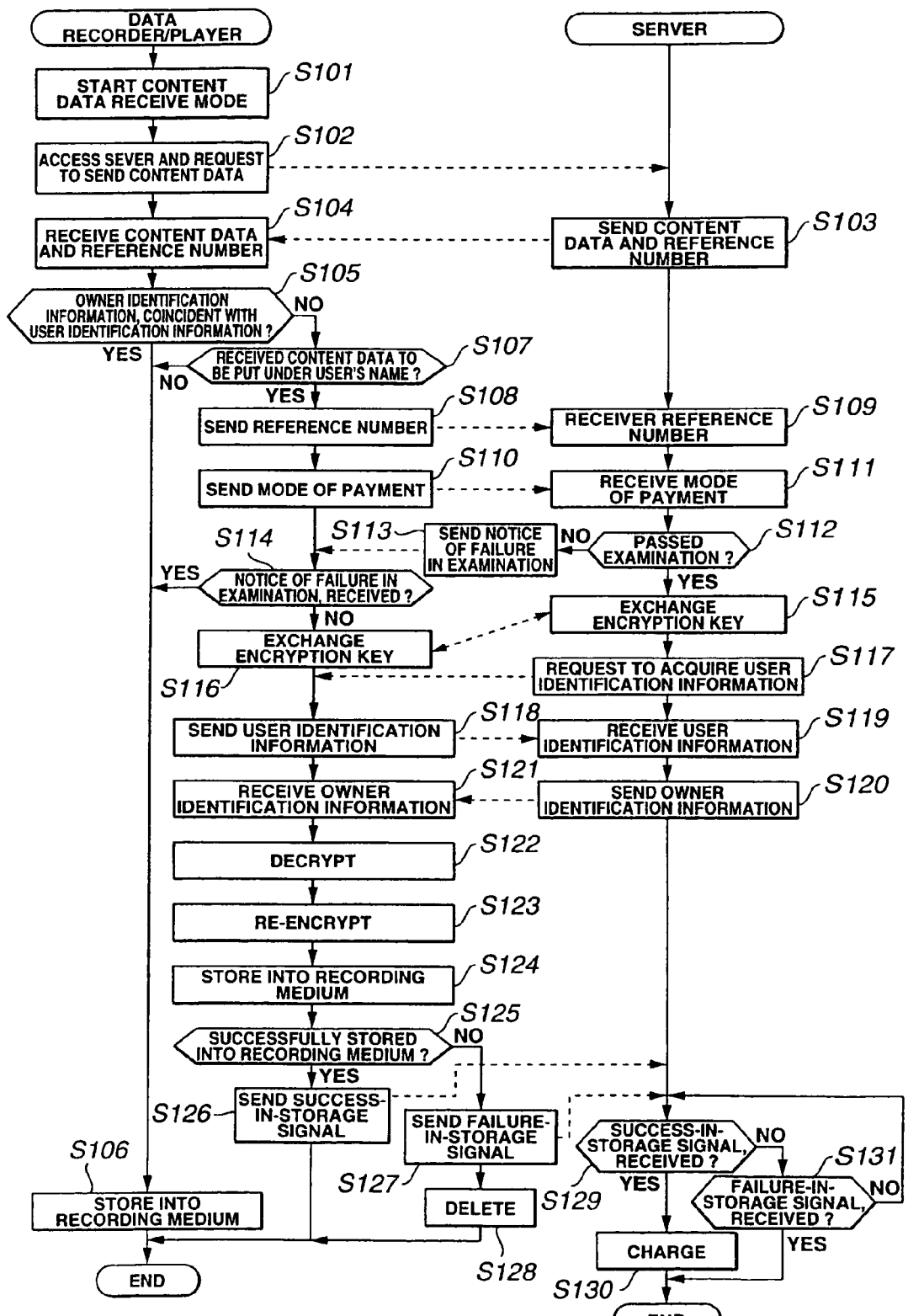
FIG. 8 shows a flow of operations made in downloading a content data from the server to the data recorder/player.

Next, a procedure for downloading a content data from the server 10 will be described with reference to the flow chart shown in FIG. 8.

First in step S101, the system controller 33 in the data recorder/player 20 starts up a reception mode in which in response to an operation by the user of the input unit 40, a content data sent from any other data recorder/player 20 is downloaded from the server 10. Next in step S102, the system controller 33 of the data recorder/player 20 accesses the server 10 via the transmission unit 23 and requests the server 10 to send a content data. In step S103, the controller 15 in the server 10 will send a content data addressed to the data recorder/player 20 having accepted the sending request from the data recorder/player 20 and a reference number for the content data to the data recorder/player 20. In step S104, the data recorder/player 20 receives, at the reception unit 24 thereof, the content data and reference number sent from the server 10.

In step S105, the system controller 33 in the data recorder/player 20 reads user identification information supplied from the input unit 40 or user identification information stored in the memory 32, and extracts the owner identification information from the owner identification information-attached content data received at the reception unit 24 by decrypting the owner identification information at the decryption unit 25. If the owner identification information extracted from the content data is coincident with the user identification information, it means that the user of the data recorder/player 20 owns the content data received at the reception unit 24. In this case, the system controller 33 goes to step S106 where it will control the storage controller 22 to record the content data as it is to the recording medium 21. Namely, the content data stored in the recording medium 21 will be reproduced following the procedure shown in FIG. 6. Also, if there is no coincidence between the owner identification information and user identification information, the system controller 33 will judge that the content data is not owned by the data recorder/player 20 and use thereof is beyond the range of private use, and then go to step S107.

In step S107, the system controller 33 in the data recorder/player 20 controls the display unit 30 to display a message to inquire the user of whether the received content data is to be put under his name. Based on a user's reply supplied from the input controller 29, the system controller 33 will judge whether the content data is to be put under his name indicated by the user identification information. That is to say, the system controller 33 judges whether the original owner of the content data grants the received content data to the addressee. When the received content data is not to be put under the name of the user of the data recorder/player 20, the system controller 33 will go to step S106. On the other hand, if the content data is to be put under the user's name, the system controller 33 goes to step S108. In step S106, the content data is stored into the recording medium 21. The content data will be reproduced following the procedure shown in FIG. 6 only when the content data owner identification information is coincident with the user identification information.

In step S108, the system controller 33 in the data recorder/player 20 sends, from the transmission unit 23 to the server 10, the reference number for the content data received at the reception unit 24. In step S109, the controller 15 in the server 10 receives the reference number at the communication unit 14.

In step S110, the system controller 33 in the data recorder/player 20 sends, from the transmission unit 23 to the server 10, a method of paying a charge for a content data granted from the addressor based on an input from the input controller 29 (credit card-based payment, payment into bank account, per-number payment, month-by-month payment or the like). Note that since the present invention concerns a digital copying of a content data, the charge referred to herein is a compensation for a copyright or a money to be paid to an addressee having contributed to the distribution of content data. In step S111, the controller 15 in the server 10 receives, at the communication unit 14, the paying method sent from the data recorder/player 20.

In step S112, the controller 15 in the server 10 connects to the server in the settlement center such as a credit card company, bank or the like to examine the content data grantee about his credibility, solvency, etc. If the grantee has been judged not to meet the credibility and solvency requirements, the controller 15 in the server 10 sends, in step S113, a notice of failure in the examination to the data recorder/player 20. When the system controller 33 in the data recorder/player 20 has received, at the reception unit 24, the notice of failure in examination sent from the server 10 in step S114, it will go to step S106. On the other hand, if it has not received the notice, it will consider that the grantee has passed the examination and go to step S116.

When the data recorder/player 20 has passed the examination in step S112, the server 10 goes to step S115. In steps S115 and S116, the data recorder/player 20 and server 10 exchange an encryption key between them for safe data exchange between them. In step S117, the controller 15 in the server 10 requests the data recorder/player 20 to acquire the information for identification of the user of the data recording/player 20. In step S118, the system controller 33 in the data recorder/player 20 sends the user identification information to the server 10. Note that the system controller 33 may be adapted to make a request for acquisition of the information for identification of the original owner of the content data (user identification information about the addressor), not to send the user identification information to the server 10.

When the communication unit 14 has received the user identification information from the data recorder/player 20 in step S119, the controller 15 in the server 10 goes to step S120 where the communication unit 14 will send, to the data recorder/player 20, the owner identification information of the original owner of the content data (user identification information about the addressor).

When the reception unit 24 has received, in step S121, the owner identification information for identification of the original owner of the content data (user identification information about the addressor), the system controller 33 of the data recorder/player 20 outputs the content data and owner identification information about the original owner of the content data to the decryption unit 25. In step S122, the decryption unit 25 is controlled by the system controller 33 in the data recorder/player 20 to decrypt the content data with the owner identification information about the original owner of the content data, and outputs the decrypted content data to the encryption unit 26. The system controller 33 judges whether the input unit 40 is connected to the I/F 31.

When the input unit 40 is found connected to the I/F 31, the system controller 33 reads the user identification information from the memory 32, and outputs it to the encryption unit 26. On the other hand, if the input unit 40 is found not connected to the I/F 31, the system controller 33 reads the user identification information from the memory 32, and outputs it to the encryption unit 26. In step S123, the encryption unit 26 will be controlled by the system controller 33 to re-encrypt the decrypted content data with the user identification information for identification of the user of the data recorder/player 20 being taken as new owner identification information for identification of the owner of the content data. Namely, the new owner identification information is used as an encryption key for this re-encryption. The encryption unit 26 encrypts the owner identification information used as the encryption key. The encryption unit 26 outputs the re-encrypted content data and owner identification information to the storage controller 22.

In step S124, the storage controller 22 is controlled by the system controller 33 to bury the owner identification information used as the encryption key into the content data, and then store them into the recording medium 21.

In step S125, the system controller 33 judges whether the content data re-encrypted by the storage controller 22 has positively been recorded to the recording medium 21. When the content data has positively been recorded to the recording medium 21, the system controller 33 sends, in step S126, a success-in-storage signal from the transmission unit 23 to the server 10. On the other hand, if the content data has not positively or successfully been recorded to the recording medium 21, the system controller 33 will send, in step S127, a failure-in-storage signal from the transmission unit 23 to the server 10. When the content data has not successfully been recorded to the recording medium 21, the system controller 33 will control, in step S128, the storage controller 22 to delete the content data having not successfully been recorded to the recording medium 21.

In step S129, the controller 15 in the server 10 judges whether the communication unit 14 has received the success-in-storage signal sent from the data recorder/player 20. When the signal has been received, the controller 15 goes to step S130. On the other hand, if the signal has not been received, the controller 15 goes to step S131.

Since the content data distributed to the data recorder/player 20 has positively been recorded to the recording medium 21 and put under another name, the controller 15 in the server 10 will make a charge to the user for the received content data. In step S131, the controller 15 in the server 10 judges whether the failure-in-storage signal has been received from the data recorder/player 20. When the signal has been received, the controller 15 will consider that the content data has not positively been granted to the grantee, and exit the procedure without making such a charge to the grantee. If the signal has not been received, the controller 15 will return to step S129.

In the foregoing, settlement by payment into bank account or credit card-based payment has been described by way of example. However, the present invention may be applied to a settlement with a prepaid card. In this case, the data recorder/player 20 is provided with a prepaid card controller which updates a prepaid card, and the prepaid card controller sends the balance in the prepaid card in step S109. When the charging can be made to the user, the server 10 goes to step S115. Also, when the charging can be made to the user, the data recorder/player 20 goes to step S116. If no charging can be made, the data recorder/player 20 goes to step S106 where it can record the content data to the recording medium 21 and send the success-in-storage signal to the server 10. Upon reception of the signal, the server 10 sends a charging instruction signal. The prepaid card controller in the data recorder/player 20 makes a charge for the prepaid card.

Figure 9:
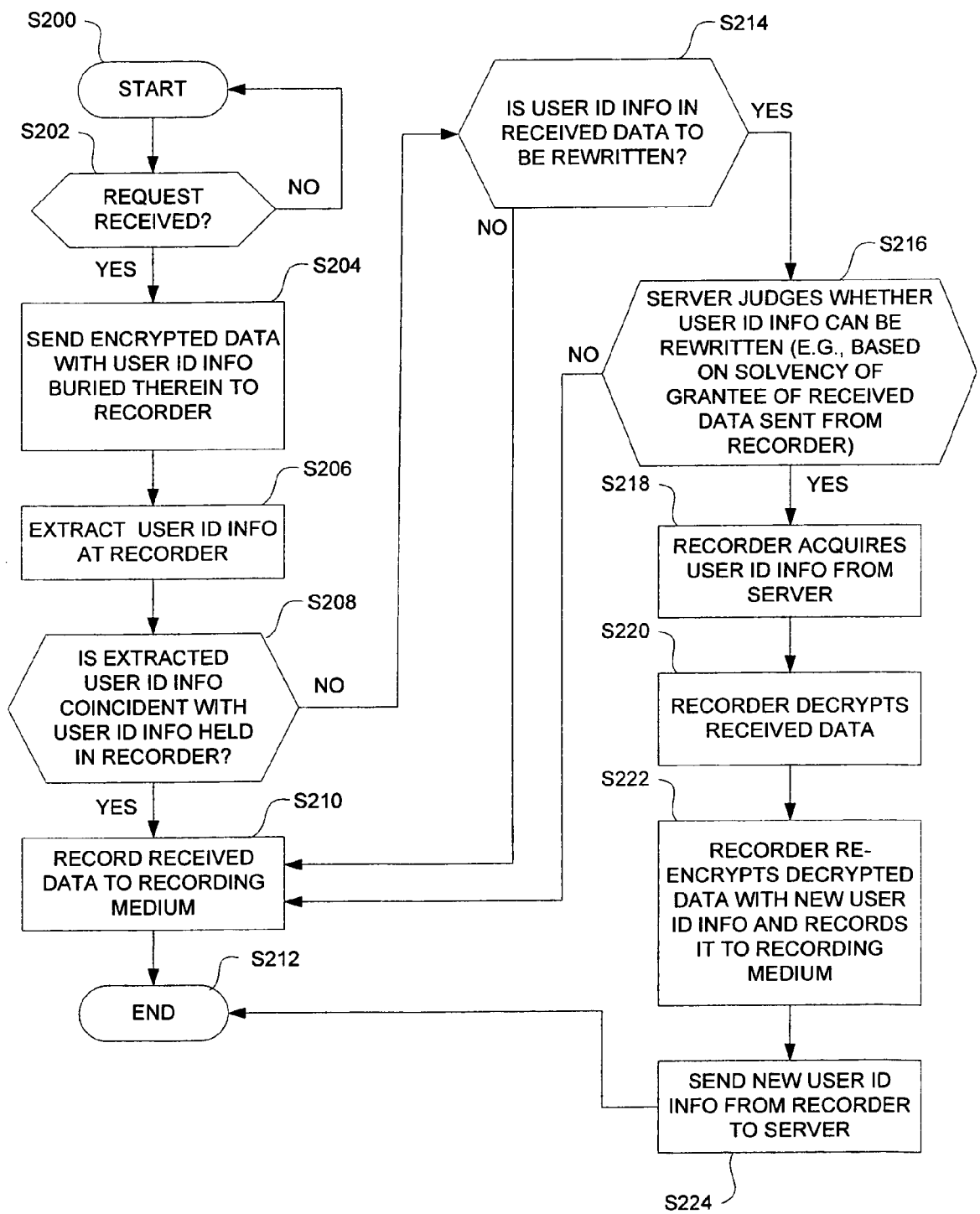
FIG. 9 shows a flow of operations made in controlling data recording in accordance with aspects of the invention.

FIG. 9 illustrates a process for controlling data recording. The process starts at step S200, and at step S202 it is determined whether a request is received. If so, at step S204 data stored in a storage unit provided by a server is sent to a recorder. The data has at least buried therein user identification information intended to identify a user and has been encrypted with the user identification information. Next, at step S206, the recorder is caused to extract the user identification information from the received data. Next, at step S208, it is judged whether the extracted user identification information is coincident with user identification information held in an information holder provided in the recorder. If so, then at step S210 the received data is recorded to a recording medium. The process then ends at step S212.

However, if it is judged that the user identification information extracted from the received data is not coincident with the user identification information held in the information holder in the player, it is judged at step S214 whether user identification information in the received data is to be rewritten. If it is judged that the user identification information in the received data is not to be rewritten, the process proceeds to step S210 where the received data is recorded to the recording medium.

When it is judged that the user identification information in the received data is to be rewritten, the server may judge whether the user identification information can be rewritten at step S216. If so, the recorder may then acquire the user identification information from the server in step S218. The server may judge whether the user identification information can be rewritten based on solvency of a grantee of the received data sent from the recorder.

Following step S218, the recorder decrypts the received data in step S220. It re-encrypts the decrypted data with new user identification information and records it to the recording medium in step S222. The new user identification information may be sent from the recorder to the server in step S224. The process then ends at step S212.

When it is judged that the user identification information cannot be rewritten, the recorder records the received data to the recording medium in step S210.

Figure 10:
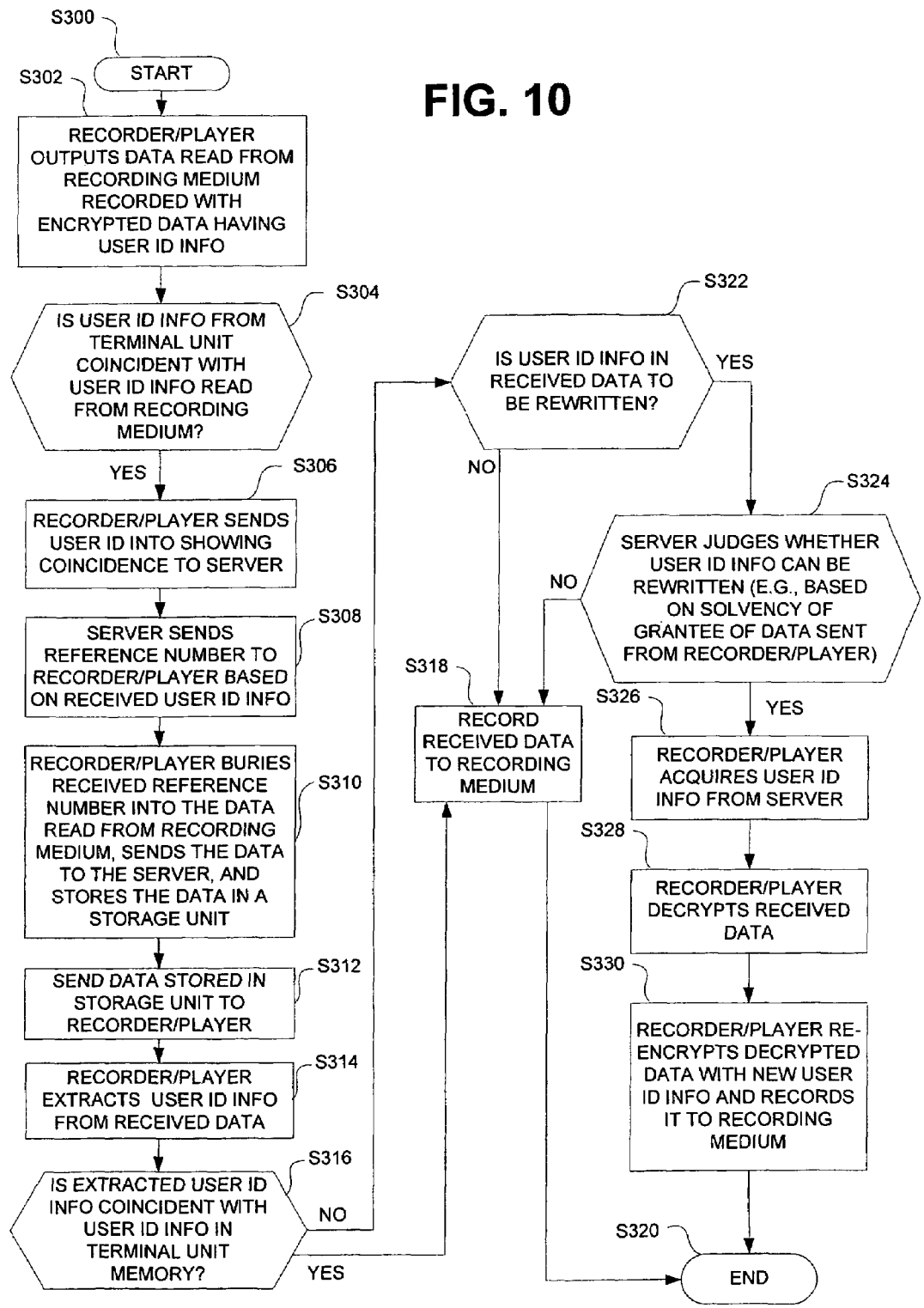
FIG. 10 shows a flow of operations made in data transmission and receiving in accordance with aspects of the invention.

FIG. 10 illustrates a data transmitting/receiving process, which starts at step S300. At step S302, a recorder/player outputs data read from a recording medium having recorded therein data having user identification information intended to identify a user and which has been encrypted with the user identification information. At step S304 it is judged whether the user identification information supplied from a terminal unit with a memory having user identification information recorded therein is coincident with the user identification information read from the recording medium.

When it is judged that the user identification information supplied from the terminal unit is coincident with the user identification information read from the recording medium, the recorder/player is caused to send to a server the user identification information showing the coincidence at step S306. At step S308 the server sends to the recorder/player a reference number based on the received user identification information. Then at step S310 the recorder/player buries the received reference number into the data read from the recording medium, sends the data to the server and stores the data into a storage unit provided in the server.

Upon request, at step S312 data stored in the storage unit provided in the server is sent to the recorder/player. At step S314, the recorder/player extracts the user identification information from the received data.

At step S316 it is judged whether the extracted user identification information is coincident with the user identification information stored in the memory in the terminal unit. If so, at step S318 the recorder/player is caused to record the received data to the recording medium. The process ends at step S320.

When it is judged that the extracted user identification information read from the recording medium is not coincident with the user identification information stored in the memory of the terminal unit, it is judged at step S322 whether user identification information in the received data is to be rewritten.

When it is judged that the user identification information in the received data is not to be rewritten or cannot be rewritten, the recorder/player records the received data to the recording medium as in step S318.

When it is judged that the user identification information in the received data is to be rewritten, at step S324 the server may judge whether the user identification information can be rewritten. In this case, the server may judge whether the user identification information can be rewritten based on solvency of a grantee of the data sent from the recorder/player. When the user identification information can be rewritten, the recorder/player acquires user identification information from the data sent from the server at step S326. Then at step S328 the recorder/player decrypts received data. At step S330 the recorder/player re-encrypts the decrypted data received from the server with new user identification information and records the data to the recording medium. Then the process ends at step S320.

With the aforementioned content data downloading method, it is possible to make a charge to an addressee for a content data downloaded by the addressee only when putting the content data under his name, by re-encrypting the content data with his owner identification information.

As having been described in the foregoing, the content distribution system 1 is adapted to allow reproduction and uploading of a content data only when the user of the data recorder/player 20 is also the owner of the content data, namely, when the user identification information is coincident with the owner identification information. Thus, the user of a content data can be limited to a range of private use. For use of a content data beyond the range of private use, namely, in case the content data is sent to another data recorder/player 20 via the network 2 for granting to any other person, the copyrighter of the content data can be protected against loss of his due profits by making a charge to the grantor or grantee of the content data. So long as the user identification information stored in the memory 32 is coincident with the content data owner identification, the user has not to carry on the input unit 40, which contributes very much to an improved operability of the data recorder/player 20. Since the user can send a desired content data to any of his other data recorder/players 20 via the network 2, the data recorder/player 20 having received the content data can reproduce the content data, which adds to the operability of this data distribution system 1.

In the foregoing, sending of an encrypted content data from one data recorder/player 20 to another data recorder/player 20 has been described by way of example. According to the present invention, however, a content data, not encrypted, can be recorded to the recording medium 21 and also the content data can be sent to anther data recorder/player 20. Further, according to the present invention, a content data can be stored in an external recording medium such as an optical disc, magnetic disc, magneto-optical disc or the like in one data recorder/player 20 and uploaded to another data recorder/player 20, without sending the content data from the one data recorder/player 20 to the other data recorder/player 20 via the network 2. In this case, a prepaid card can be used to make a charge to the grantee of the content data, not via the network 2.

In the foregoing, charging to the grantee of a content data has been described by way of example. According to the present invention, however, charging can be done to the grantor of the content data at the time of uploading the content data. This is suitable for free granting of a content data from the user to his friend or the like, namely, for presenting the content data. In this case, the charging may be done at the server 10 or a prepaid card controller may be provided at the data recorder/player 20 of the grantee of a content data to make a charge to the grantee using the prepaid card.

In the foregoing, charging to the grantee when granting a content data to any other person has been described by way of example. According to the present invention, however, a content data can be granted for a limited cumulated time of playback such as one hour, three hours, 30 days or the like.

In the foregoing, use of the input unit 40 to input information for identification of the user the data recorder/player 20 has been described by way of example. According to the present invention, however, the user identification information can be granted by the server 10 providing the data distribution service.

The above-mentioned operations can be implemented by either hardware or software.

INDUSTRIAL APPLICABILITY

According to the present invention, a content data can be outputted only when a judging means has judged that information for identification of the user of a recorder/player is coincident with information for identification of the owner of the content data. When the device user identification information is not coincident with the content data-owner identification information, the content data owner name, that is, the owner identification information, is rewritten to the user identification information. At this time of owner identification information rewriting can be made to the current owner. Therefore, when the owner of the content data uses the content data beyond the range of private use, restriction such as charging can be applied to the content data owner.

The invention of claimed is:

1. A playback method for decrypting encrypted data read from a recording medium, comprising the steps of:

when a player is going to play back the recording medium containing user identification information, intended to identify a user, and data encrypted with the user identification information, causing the player to detect whether a terminal unit with a memory having the user identification information recorded therein along with the data is connected to the player;

when it is detected that the terminal unit is connected to the player, exchanging an encryption key between the player and the terminal unit;

encrypting the user identification information read from the memory of the terminal unit with the exchanged encryption key and sending it from the terminal unit to the player;

judging whether the user identification information sent from the terminal unit is coincident with the user identification information read from the recording medium; and decrypting the encrypted data read from the recording medium when it is judged that the user identification information sent from the terminal unit is coincident with the user identification information read from the recording medium.

2. The method according to claim 1, wherein when it is judged that the user identification information sent from the terminal unit is not coincident with the user identification information read from the recording medium, output of data read from the recording medium is inhibited.

3. The method according to claim 1, wherein:
when it is detected that the terminal unit is connected to the player, the player authenticates the terminal unit; and
when the player has not successfully authenticated the terminal unit, output of data read from the recording medium is ceased.

4. The method according to claim 3, wherein when the player has not successfully authenticated the terminal unit, an error message is displayed.

5. The method according to claim 1, wherein when it is detected that the terminal unit is not connected to the recorder, a display is made to indicate that the terminal unit is not connected.

6. The method according to claim 1, wherein the user identification information stored in the memory of the terminal unit is set by the user.

7. The method according to claim 6, wherein the user identification information includes a user name.

8. The method according to claim 7, wherein the user identification information includes information unique to the terminal unit, having been set at the time of shipment from factory.

9. A method of playing back a recording medium, comprising:
when a player is going to play back a recording medium containing user identification information, intended to identify a user, and data having been encrypted with the user identification information and stored in the recording medium therewith, judging whether user identification information read from an information holder provided in the player to hold user identification information sent from a terminal, unit is coincident with user identification information read from the recording medium;
decrypting encrypted data read from the recording medium when the user identification information read from the information holder provided in the player is coincident with the user identification information read from the recording medium; and
exchanging an encryption key between the player and terminal unit when the terminal unit is connected to the player;
encrypting the user identification information read from the memory of the terminal unit with the exchanged encryption key; and
sending the encrypted user identification information from the terminal unit to the player.

10. A data transmitting method, comprising the steps of:
when an output unit to output data read from a recording medium having data recorded therein that includes user identification information intended to identify a user and data which has been encrypted with the user identification information is going to output data read from the recording medium, judging whether user identification information supplied from a terminal unit having the user identification information stored in memory of the terminal unit is coincident with the user identification information read from the recording medium; and when it is judged that the user identification information supplied from the terminal unit is coincident with the user identification information read from the recording medium causing the output unit to send to a server, the user identification information showing the coincidence, wherein the server sends to the output unit a reference number based on the received user identification information; and the output unit buries the received reference number into the data read from the recording medium and sends the data to the server.

11. The method according to claim 10, wherein:
when it is judged that the user identification information supplied from the terminal unit is coincident with the user identification information read from the recording medium, an encryption key is exchanged between the output unit and the server; and
the user identification information showing the coincidence is encrypted with the exchanged encryption key and sent to the server.

12. The method according to claim 10, wherein when it is judged that the user identification information supplied from the terminal unit is not coincident with the user identification information read from the recording medium, data read from the recording medium will not be sent.

13. The method according to claim 10, wherein when it is judged that the user identification information supplied from the terminal unit is not coincident with the user identification information read from the recording medium, a display is made on a display unit of an output unit to prompt a user to select other data recorded in the recording medium.

14. The method according to claim 10, wherein data sent from the output unit is stored in a storage unit provided in the server.

15. The method according to claim 10, further comprising steps of:
detecting whether the terminal unit is connected;
judging when the terminal unit is connected and whether the user identification information sent from the terminal unit is coincident with the user identification information read from the recording medium; and
decrypting data read from the recording medium when the user identification information sent from the terminal unit is coincident with the user identification information read from the recording medium.

16. The method according to claim 15, wherein when the terminal unit is connected, an encryption key is exchanged between the output unit and the terminal unit, and the user identification information read from the memory of the terminal unit is encrypted with the exchanged encryption key and sent from the terminal unit to the output unit.

17. The method according to claim 15, wherein:
the output unit has an information holder to hold the user identification information sent from the terminal unit; and
when it is detected that the terminal unit is not connected, it is judged whether the user identification information read from the information holder is coincident with the user identification information read from the recording medium.

18. A method for controlling data recording, comprising the steps of:
   upon request, sending data stored in a storage unit provided in a server, said data having at least buried therein user identification information intended to identify a user and having been encrypted with the user identification information, to a recorder;
   causing the recorder to extract the user identification information from the received data;
   judging whether the extracted user identification information is coincident with user identification information held in an information holder provided in the recorder; and
   recording the received data to a recording medium when the extracted user identification information is coincident with the user identification information held in the information holder provided in the recorder;
   wherein when it is judged that the user identification information extracted from the received data is not coincident with the user identification information held in the information holder in the player, it is judged whether user identification information in the received data is to be rewritten;
   wherein when it is judged that the user identification information in the received data is not to be rewritten, the received data is recorded to the recording medium.

19. The method according to claim 18, wherein when it is judged that the user identification information in the received data is to be rewritten, the recorder acquires the user identification information from the server, decrypts the received data, re-encrypts the decrypted data with new user identification information and records it to the recording medium.

20. The method according to claim 19, wherein when it is judged that the user identification information in the received data is to be rewritten, the new user identification information is sent from the recorder to the server.

21. The method according to claim 19, wherein:
   when it is judged that the user identification information in the received data is to be rewritten, the server judges whether the user identification information can be rewritten; and
   when the user identification information can be rewritten, the recorder acquires the user identification information from the server.

22. The method according to claim 21, wherein the server judges, based on solvency of a grantee of the received data sent from the recorder, whether the user identification information can be rewritten.

23. The method according to claim 21, wherein when it is judged that the user identification information cannot be rewritten, the recorder records the received data to the recording medium.

24. The method according to claim 19, wherein user identification information is acquired from the received data; the received data is decrypted with the user identification information acquired from the received data; and
   when the data has not successfully been recorded to the recording medium, the recorder deletes the received data.

25. The method according to claim 23, wherein:
   the received data decrypted with the new user identification information is re-encrypted; and
   when the re-encrypted received data has not successfully been recorded to the recording medium, the recorder sends a failure-in-storage signal to the server.

26. The method according to claim 19, wherein:
   the received data decrypted with the new user identification information is re-encrypted; and
   when the re-encrypted received data has successfully been recorded to the recording medium, a grantee of the received data is charged for the data thus recorded.

27. The method according to claim 25, wherein:
   the received data decrypted with the new user identification information is re-encrypted; and
   when the re-encrypted received data has successfully been recorded to the recording medium, the recorder supplies the server with a success-in-storage signal and a grantee of the received data is charged based on the success-in-storage signal.

28. The method according to claim 19, wherein:
   a reference signal is additionally buried in data to be stored into the storage unit provided in the server; and
   when it is judged that user identification information in the received data is to be rewritten, the recorder sends the reference signal to the server and the server will operate based on the received reference signal.

29. A data transmitting/receiving method, comprising the steps of:
   when a recorder/player outputs data read from a recording medium having recorded therein data having user identification information intended to identify a user and which has been encrypted with the user identification information, judging whether the user identification information supplied from a terminal unit with a memory having user identification information recorded therein is coincident with the user identification information read from the recording medium;
   when it is judged that the user identification information supplied from the terminal unit is coincident with the user identification information read from the recording medium, causing the recorder/player to send to a server the user identification information showing the coincidence, wherein
   the server sends to the recorder/player a reference number based on the received user identification information;
   the recorder/player buries the received reference number into the data read from the recording medium, sends the data to the server and stores the data into a storage unit provided in the server; and
   upon request, sending data stored in the storage unit provided in the server to the recorder/player, wherein
   the recorder/player extracts the user identification information from the received data;
   judging whether the extracted user identification information is coincident with the user identification information stored in the memory in the terminal unit; and
   causing the recorder/player to record the received data to the recording medium when it is judged that the extracted user identification information is coincident with that stored in the memory of the terminal unit.

30. The method according to claim 29, wherein when it is judged that the user identification information supplied from the terminal unit is not coincident with the extracted user identification information read from the recording medium, ceasing reading of the data from the recording medium.

31. The method according to claim 29, wherein when it is judged that the extracted user identification information read from the recording medium is not coincident with the user identification information stored in the memory of the terminal unit, judging whether user identification information in the received data is to be rewritten.

32. The method according to claim 31, wherein when it is judged that the user identification information in the received data is not to be rewritten, the recorder/player records the received data to the recording medium.

33. The method according to claim 32, wherein when it is judged that the user identification information in the received data is to be rewritten, the recorder/player acquires user identification information in the data sent from the server, decrypts the data received from the server, re-encrypts the decrypted data received from the server with new user identification information and records the data to the recording medium.

34. The method according to claim 33, wherein:
when it is judged that the user identification information in the received data is to be rewritten, the server judges whether the user identification information can be rewritten; and
when the user identification information can be rewritten, the recorder/player acquires user identification information from the data sent from the server.

35. The method according to claim 34, wherein the server judges, based on solvency of a grantee of the data sent from the recorder/player, whether the user identification information can be rewritten.

36. The method according to claim 35, wherein when it is judged that the user identification information cannot be rewritten, the recorder/player records the received data to the recording medium.

37. The method according to claim 33, wherein user identification information is acquired from the received data; the received data is decrypted with the user identification information acquired from the received data;
the decrypted received data is re-encrypted with new user identification information; and
when the received data has not successfully been recorded to the recording medium, the recorder/player deletes the received data that has not successfully been recorded.

38. The method according to claim 37, wherein:
the received data decrypted with the new user identification information is re-encrypted; and
when the re-encrypted received data has not successfully been recorded to the recording medium, the recorder/player sends a failure-in-storage signal to the server.

39. The method according to claim 33, wherein:
the received data decrypted with the new user identification information is re-encrypted; and
when the re-encrypted received data has successfully been recorded to the recording medium, a grantee of the received data is charged for the data thus recorded.

40. The method according to claim 39, wherein:
the received data decrypted with the new user identification information is re-encrypted; and
when the re-encrypted received data have successfully been recorded to the recording medium, the recorder supplies the server with a success-in-storage signal and the grantee of the received data is charged based on the success-in-storage signal.

* * * * *

UNITED STATES PATENT AND TRADEMARK OFFICE
CERTIFICATE OF CORRECTION

PATENT NO. : 7,231,520 B2 Page 1 of 1
APPLICATION NO. : 10/088336
DATED : June 12, 2007
INVENTOR(S) : Tatsuya Inokuchi, Yoichiro Sako and Mitsuru Toriyama It is certified that error appears in the above-identified patent and that said Letters Patent is hereby corrected as shown below:

Column 1, line 46, "users" should read --user--.

Column 7, line 53, "sent" should read --send--.

Column 8, line 23, after "example", insert --,--.

Column 10, line 6, "exchanges" should read --exchange--.

Column 21, line 36, after "from", insert --the--.

Column 21, line 47, after "terminal", delete ",".

Column 22, line 4, after "in", insert --the--.

Column 22, line 44, after "comprising", insert --the--.

Signed and Sealed this

Eighteenth Day of March, 2008

JON W. DUDAS
*Director of the United States Patent and Trademark Office*